May 8, 1962     N. A. SCHUSTER     3,034,041
FEEDBACK AMPLIFYING SYSTEMS
Filed Aug. 17, 1955     2 Sheets-Sheet 1

*INVENTOR.*
NICK A. SCHUSTER.
BY
*HIS ATTORNEY.*

May 8, 1962  N. A. SCHUSTER  3,034,041
FEEDBACK AMPLIFYING SYSTEMS
Filed Aug. 17, 1955  2 Sheets-Sheet 2
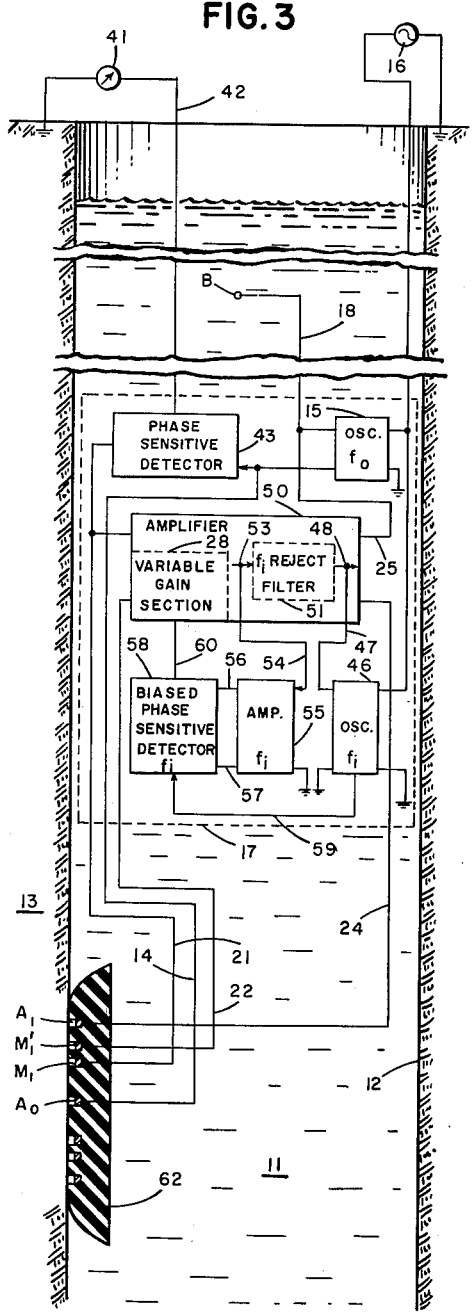
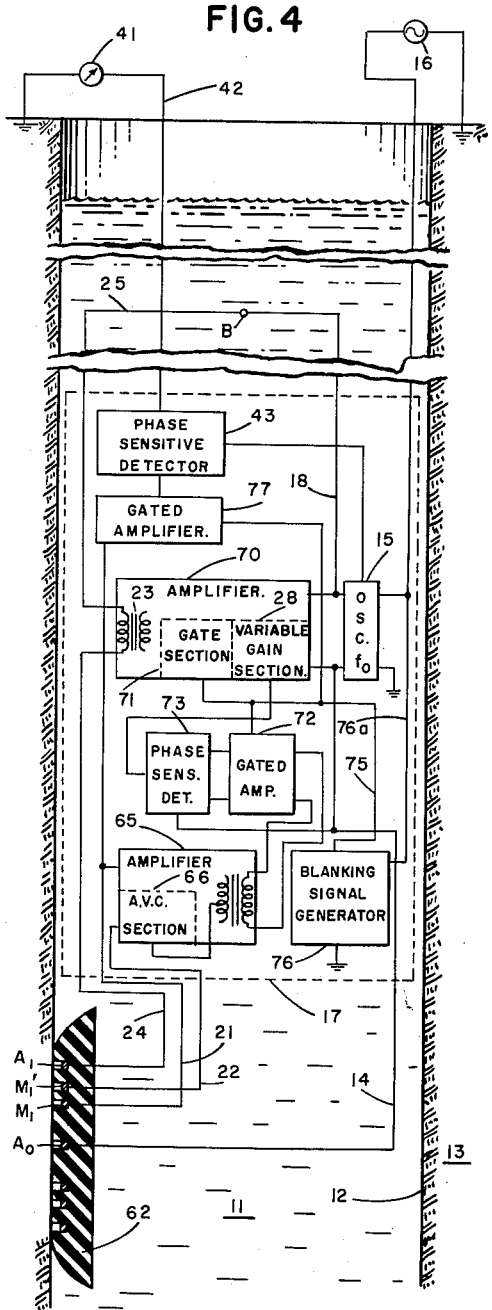
INVENTOR.
NICK A. SCHUSTER.
BY *William R. Sherman*
HIS ATTORNEY United States Patent Office 3,034,041
Patented May 8, 1962

3,034,041
FEEDBACK AMPLIFYING SYSTEMS
Nick A. Schuster, Ridgefield, Conn., assignor, by mesne assignments, to Schlumberger Well Surveying Corporation, Houston, Tex., a corporation of Texas
Filed Aug. 17, 1955, Ser. No. 529,016
25 Claims. (Cl. 324—1)

This invention relates to feedback amplifying systems and more particularly to such systems useful in regulating well logging currents.

In H. G. Doll Patents Nos. 2,712,627; 2,712,628; 2,712,629; and 2,712,630, issued July 5, 1955, various electrical logging systems are disclosed which utilize a controlled electric field to confine a survey current emitted by an electrode in a borehole essentially to a path perpendicular to the wall of the borehole. This electric field is maintained by a feedback amplifying system which passes an auxiliary feedback current into formations traversed at successive depths to create a region of zero potential difference bounding the path of the survey current. By means of the amplifying system, the auxiliary current is automatically adjusted as different resistivities are encountered in order to minimize a potential difference detected in the desired bounding region. The higher the gain of the amplifying system, the nearer this potential difference can be made to approach zero. Such systems have proved highly successful. However, because passage of the feedback signal through the formations subjects the feedback loop gain to wide variations, the amplifier system must be of exacting design if it is to be stable with a high gain when the loop gain rises to high values.

Whenever the loop gain of a feedback amplifying system varies widely, this problem of stability is encountered. The presence in the feedback loop, of an element such as a changing portion of earth formations with an unknown variable gain or attenuation renders particularly difficult any regulation of feedback to ensure system stability.

It is an object of the present invention, accordingly, to provide novel methods and apparatus for feedback regulation whereby undesirable variations in feedback loop gain are diminished.

Another object is to provide such methods and apparatus which will facilitate stable, high gain amplification despite a variable gain element in the feedback loop.

Yet another object of this invention is to provide new and improved methods and apparatus for regulating well logging currents with stability and with a simplification of design requirements.

These and other objects are attained, in accordance with the invention, by regulating the loop gain of a signal traversing the feedback loop of an amplifying system. To accomplish this regulation, an information signal subject to a variation representing a like variation in loop gain is passed through at least a portion of the feedback loop with the feedback signal. A difference in time characteristics of the two signals facilitates separate detection of the information signal. Changes in feedback loop gain are offset, then, by varying the gain of an amplifying stage in the feedback loop as a function of the detected value of the information signal.

In one form of the invention, the loop gain for a feedback signal of one frequency is stabilized by varying the gain of a feedback amplifier to maintain the level of its oscillations at a second frequency constant. The oscillatory signal of the second frequency traverses the feedback loop to experience the loop gain and thereby serves as an information signal. In another form of the invention, a separate oscillator provides the information signal. In yet another form, the loop gain of a feedback amplifying system varies directly with a varying input signal. To stabilize the loop gain, time sharing use of the input signal is made to derive an information signal for effecting an inverse variation in the gain of an amplifying stage.

The invention will be better understood, and others of its objects and advantages will be perceived from the following detailed description taken in conjunction with the drawings, in which:

FIG. 3 is a schematic representation of another embodiment of this invention utilizing a separate oscillator for the information signal; and FIG. 4 is a schematic representation of yet another embodiment, which operates on a time sharing basis.

Figure 1:
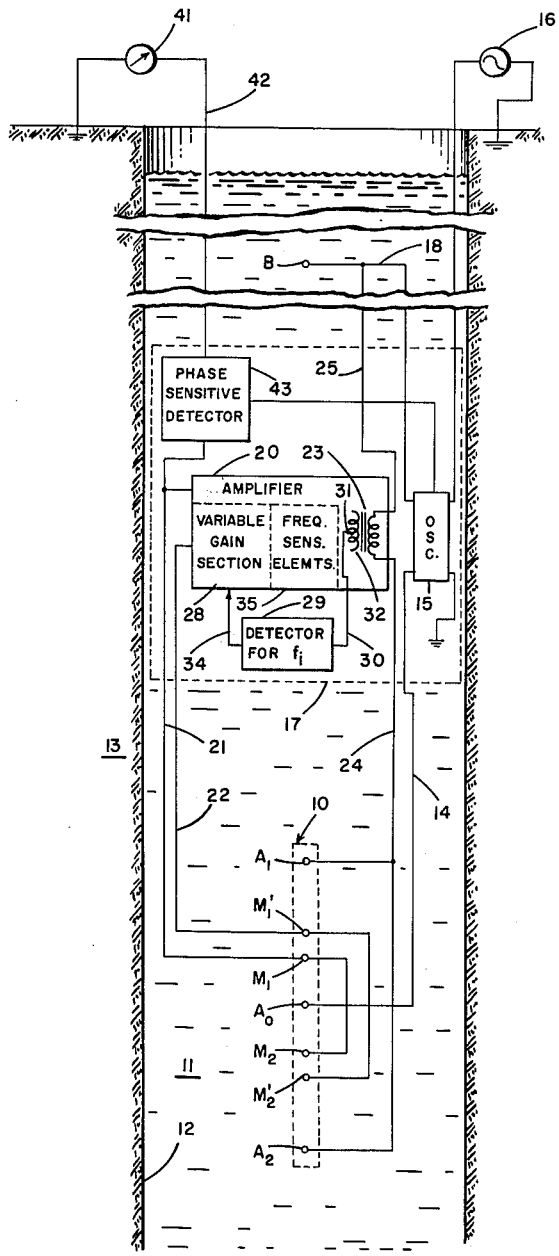
FIG. 1 is a schematic representation of apparatus constructed in accordance with this invention and disposed in a borehole for determining formation resistivity values.

In FIG. 1 a signal amplifying system adapted for electrical well logging is shown which comprises an electrode array 10 disposed in a conductive liquid 11 such as drilling mud for movement through a borehole 12 past formations 13. For the purpose of introducing a survey current into formations 13, a main electrode $A_0$ of the array 10 is connected by conductor 14 to an oscillator 15 which generates current at a frequency $f_0$ when energized by a suitable energy source 16 located at the earth's surface. A pressure resistant housing 17 is conveniently provided to enclose the oscillator 15, as well as other electronic components, and to support the same for movement with the array 10 of electrodes. To complete a circuit for the survey current, conductor 18 connects the output of the oscillator 15 with a current return electrode B sufficiently removed from the electrode $A_0$ that its distance may be considered infinite insofar as the presence of the electrode B affects potentials in the vicinity of the electrode $A_0$.

As will be clearly understood from the disclosure of aforementioned Patent No. 2,712,627, very effective measurements of resistivity may be obtained by introducing auxiliary current through auxiliary electrodes $A_1$ and $A_2$ located on either side above and below the electrode $A_0$ of a magnitude and polarity tending to create regions of substantially zero potential difference across pairs of monitoring electrodes $M_1$, $M_1'$ and $M_2$, $M_2'$ located intermediate the electrodes $A_0$, $A_1$, and $A_0$, $A_2$, respectively. The establishment of such regions of zero potential difference may be considered as substantially plugging the borehole against a longitudinal flow of survey current through the conductive liquid 11, whereby the flow of survey current tends to enter the formations 13 opposite electrode $A_0$ in a concentrated path normal to the borehole wall. Such a concentration of the survey current in the formation serves as a basis for obtaining highly detailed and accurate measurements of formation resistivities.

To maintain this concentration of survey current automatically, a feedback amplifier 20 has its input connected by conductors 21 and 22, respectively, to electrodes $M_1$ and $M_1'$ and to electrodes $M_2$ and $M_2'$. The output of amplifier 20, which may be the secondary winding of output transformer 23, is connected by conductor 24 to auxiliary current electrodes $A_1$ and $A_2$ and by conductor 25 to current return electrode B. Thus, the amplifier 20 is supplied with the potential difference existing across the monitoring electrodes and introduces an auxiliary current of frequency $f_0$ above and below the monitoring electrodes, which auxiliary current is returned at the electrode B. This auxiliary current at electrodes $A_1$, $A_2$ is in phase with the survey current introduced at the electrode $A_0$ so as to diminish the potential difference appearing across the monitoring electrodes $M_1$, $M_1'$ and $M_2$, $M_2'$. Accordingly, a first component of the potential across monitoring electrodes $M_1$ and $M_1'$ is attributable to the survey current from the electrode $A_0$, while a second component of this potential opposing the first is attributable to the auxiliary current from the electrode $A_1$.

Assuming that the oscillator 15 furnishes a steady survey current, as is generally preferred, the first component, hereafter referred to as the input signal, will vary as a function of changes in resistivity especially along concentrated portions of its flow path through the adjacent media. The second component, on the other hand, constitutes an inverse feedback signal which depends in value not only upon the potential output of the amplifier 20 but also upon the resistivities of the media along the flow path of the auxiliary current. This feedback signal flows in a feedback loop comprising the amplifier 20, conductor 24, electrodes $A_1$ and $A_2$, the conductive media between these electrodes and electrode pairs $M_1$, $M_1'$ and $M_2$, $M_2'$, and conductors 21, 22. In the amplifier 20 and in the media (which include the drilling fluid, any filter cake on the borehole wall, as well as the formations), the feedback signal will experience a "gain."

The "gain" of the media or formations will be understood to equal the ratio of the change in potential difference across electrodes $M_1$ and $M_1'$ corresponding to an incremental change in the potential of electrode $A_1$ or $A_2$. In some regions, the change in this gain of the formations may vary in the course of traversing a given borehole by as large a ratio as 1000 to 1 and will frequently be over 100 to 1. Consequently, the gain of the feedback loop which includes the output path for the auxiliary current and the input path for the monitored potential difference will tend likewise to vary over this extreme range.

In accordance with this invention, the tendency toward such loop gain variations is minimized to simplify the design requirements for the amplifier 20 while obtaining a desired degree of stability over a wide range of measurements. Thus, the amplifier 20 provided by this invention includes a variable gain section 28 in the nature of an automatic volume control circuit utilizing, for example, a variable gain pentode with suppressor grid control. This variable gain section 28 is included to afford a means of raising or lowering the gain of the amplifier to compensate for the reduction or increase in gain experienced by the auxiliary feedback signal in passing through the formations 13. The formations 13 may be viewed as an electrodynamic coupling between each of electrodes $A_0$, $A_1$ and $A_2$ and the corresponding monitoring electrodes $M_1$, $M_1'$ or $M_2$, $M_2'$. In this broad view, the formations 13 may be considered an element in both the input circuit and the feedback loop.

In a manner described hereafter, an information signal is circulated about the feedback loop traversed by the feedback signal but has a different frequency $f_1$. To detect this information signal separately from the auxiliary feedback signal, a detector 29 selectively responsive to the frequency $f_1$ is provided. This detector 29 is connected by a conductor 30 to some convenient point in the circuit of the amplifier 20 such as a midtap 31 in primary winding 32 of the output transformer 23. By means of a conductor 34, the output of detector 29 is supplied to the variable gain section 28 to control its gain. Since the gain for the auxiliary feedback signal in the amplifier 20 is fixed relative to the gain for the information signal, the loop gains for the information signal and auxiliary feedback signal are proportionately affected by changes in the gain of the variable gain section 28.

Of the various means contemplated for introducing an information signal into the feedback loop, substantial advantages flow from the arrangement of FIG. 1 for introducing the information signal by low level oscillations or modulations within the amplifier 20 itself. By a suitable adjustment of the variable gain section 28, such oscillations or modulations may be sustained at a level which does not saturate the amplifier 20 and yet provides a signal to the variable gain section 28 sufficient for regulation of the loop gain of the auxiliary feedback signal. For example, the loop gain for the information signal may be regulated at a value of substantially unity. The value of loop gain for the auxiliary feedback signal may then be directly ascertained from the gain-frequency characteristics of the amplifier 20, and is either inverse or regenerative, as desired, in accordance with the phase shift characteristics given the amplifier 20 as a function of frequency.

Figure 2:
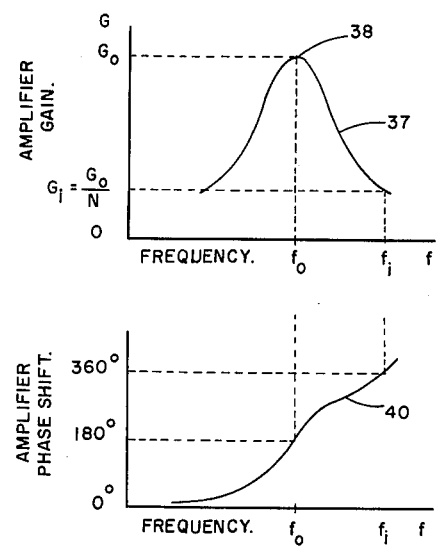
FIG. 2 is a graphic representation of the variation in gain and phase shift with frequency for the variable gain feedback amplifier shown in FIG. 1.

In FIG. 2 graphic representations of these characteristics are illustrated to exemplify the gain, frequency and phase relationships for obtaining the inverse feedback signal employed with the apparatus of FIG. 1. It will be apparent, of course, that other characteristics may be employed to obtain regenerative feedback or other desired feedback characteristics. While any amplifier has inherent characteristic changes of gain and phase shift as a function of frequency, frequency sensitive elements 35 of conventional character may be included in the amplifier 20 for obtaining exactly the characteristics desired.

Curve 37 of FIG. 2, illustrating the relationship of the amplifier gain G to the frequency $f$ of the amplified signal, represents at point 38 that a maximum gain $G_0$ is obtained when the auxiliary feedback signal at frequency $f_0$ is amplified. For this same frequency $f_0$, curve 40 relating the amplifier phase shift to the frequency shows the phase shift to be 180° constituting a reversal of polarity between the input and the output of the amplifier 20. The input and output of the feedback amplifier 20 are so connected in the system that the auxiliary feedback signal at the electrodes $M_1$, $M_1'$ is in inverse or bucking relationship to the input signal attributable to the survey current from main electrode $A_0$.

With the illustrated characteristics 37, 40, oscillation occurs at the relatively constant frequency $f_1$ where curve 37 shows the gain to be $G_1$ and curve 40 shows the amplifier phase shift to be 360°. As indicated on the curve 37 graph, N denotes the ratio of the gain $G_0$ to the gain $G_1$ within the amplifier 20. Because the formation gain is the same for both $f_0$ and $f_1$, N also denotes the ratio of the "loop" gains. With the variable gain section 28 regulated to give a loop gain of unity for the information signal, a loop gain for the auxiliary feedback signal N times as large or, in other words, of a value N is obtained. For an overall accuracy of 4%, for example, N should be selected to provide a loop gain of 25 for the auxiliary feedback signal. N may be given the desired value by suitable selection of the gain versus frequency characteristic of the amplifier 20, particularly, by suitable selection of the frequency sensitive elements 35.

It will be realized that the gain-frequency characteristic 37 depicts the values for only a single adjustment of the variable gain section 28 and that actually this characteristic shifts vertically in correspondence with the change of gain accomplished by the action of the informative feedback signal upon the variable gain section 28. Spurious oscillations are avoided, since the gain is not sufficient at any frequency other than $f_1$ to produce a regenerative feedback in support of oscillations.

As taught in the above-mentioned Patent No. 2,712,627, an indication of apparent formation resistivity may be derived by detecting a potential in the vicinity of the electrode $A_0$. To this end, an indicating device 41 which may be a galvanometric type recorder grounded at the earth's surface is connected by conductor 42 through a phase-sensitive detector 43 to electrode $M_1$. The phase-sensitive detector 43 is supplied with a reference signal at frequency $f_0$ from the oscillator 15 in order to provide linear rectification of the potential of monitoring electrode $M_1$ at frequency $f_0$ while excluding any potential component at frequency $f_1$.

In an exemplary operation of the apparatus of FIG. 1, survey current is introduced at the electrode $A_0$ with a reference or zero phase angle, electrodynamically producing a potential difference across monitoring electrodes $M_1$, $M_1'$ dependent upon the gain of the formations 13. The resulting monitoring signal is supplied to the amplifier 20 for a gain $G_0$. An amplified version of the monitored signal is supplied to electrode $A_1$ for introduction into the formations 13 as an inverse auxiliary feedback signal at the reference or zero phase angle tending to diminish the monitored signal. The loop gain for the auxiliary feedback signal is then the product of the amplifier gain $G_0$ and the formation gain $G_f$ between electrode $A_1$ and electrodes $M_1$, $M_1'$.

At the same time, however, the amplifier 20 oscillates at frequency $f_1$ to supply a regenerative information signal to the electrode $A_1$. This information signal experiences the selfsame gain $G_f$ in the formations 13 as is experienced by the auxiliary feedback signal through electrodynamic coupling to the monitoring electrodes. The monitored version of the information signal is supplied to the amplifier 20 for amplification in the variable gain section 28 and other stages for a total amplifier gain of $G_i$. By means of the gain control loop 30, 34 including detector 29, this information signal is caused to regulate the feedback loop gain through adjustment of the amplification in the variable gain section 28.

With the feedback loop gain of the amplifying system regulated, a stable operation is ensured whereby the potential difference across the monitoring electrodes is driven toward zero. As the electrode array is moved through the borehole, the surveying current passing from electrode $A_0$ into the adjacent formations is constrained to a path essentially normal to the borehole wall. Accordingly, the potential of electrode $M_1$ as indicated by the device 41 represents the resistivity of successive formations within which the survey current is concentrated.

By the apparatus of FIG. 1 then, detailed and accurate indications of formation resistivities are obtained with stability of the amplifying means over a wide range of formation resistivity conditions, yet without severe requirements upon the amplifier circuitry. Sufficient gain may be incorporated in the amplifier to meet highly varied resistivity logging conditions with slight expense and risk of undesirable system oscillations. At the same time, the regulation of loop gain to obtain these advantages requires only a modification of the amplifier circuitry conventionally employed and the addition of a detector for the information signal which is generated in the amplifier.

While an oscillatory signal of different frequency may thus be utilized as an information signal, any signal having a characteristic by which it may be distinguished from the auxiliary feedback signal (such as a phase, modulation, frequency, or time-sharing characteristic) may be passed around the feedback loop 24 to control the loop gain for the feedback signal. In the system of FIG. 3, an information signal at frequency $f_1$ is introduced into the feedback loop by means of an oscillator 46. Injection of the information signal over conductor 47 conveniently occurs at point 48 in feedback amplifier 50 just beyond an interstage filter 51 designed to reject signals of frequency $f_1$. The amplifier 50 includes the variable gain section which constitutes an amplification stage in advance of the rejection filter 51. Intermediate the variable gain section and the rejection filter at a convenient point 53, the information signal is withdrawn from the amplifier 50 via conductor 54 and is supplied to the input of amplifier 55 tuned to the frequency $f_1$. The output of this amplifier is supplied via conductors 56, 57 to a biased phase sensitive detector 58. Since this detector 58 is supplied with a reference signal at frequency $f_1$ over conductor 59, its output carried over conductor 60 will be rectified version of the information signal corresponding in value to the magnitude of the information signal at point 53 in the amplifier 50.

As illustrated in FIG. 3, the feedback loop traversed by the information signal is utilized in a well logging system of the type disclosed in the above-mentioned Patent No. 2,712,629, this system being particularly adapted to resistivity measurements in media contiguous to a borehole wall. In this well logging system, a cushion member 62 has imbedded in its face electrodes $A_0$, $M_1$, $M_1'$ and $A_1$ which may be arranged concentrically. The potential of the electrode $A_1$ is again determined by the output of amplifier 50 and constitutes an inverse feedback signal tending to nullify the potential difference across electrodes $M_1$, $M_1'$ produced by flow of survey current at frequency $f_0$ from the electrode $A_0$.

In operation, the oscillator 15 is energized to pass survey current of frequency $f_0$ from the electrode $A_0$ into the traversed formations. Contemporaneously, the oscillator 46 is energized to inject the information signal of frequency $f_1$ at the point 48. This signal together with the feedback signal at frequency $f_0$ derived from amplifier 50 is passed via conductors 24, 25 through a path in the formations extending between electrode $A_1$ and the remote reference electrode B. As the potential on the electrode $A_1$ varies, a varying component of potential difference across electrodes $M_1$ and $M_1'$ is electrodynamically induced dependent in value upon the formation gain. The portion of this component of potential difference at frequency $f_0$ is opposed to the component of potential difference induced by current flow from the electrode $A_0$. Hence the amplifier 50 operates degeneratively to establish a region of substantially zero potential difference intermediate electrodes $A_0$ and $A_1$ insofar as the field at frequency $f_0$ is concerned.

The component of potential difference across electrodes $M_1$, $M_1'$ at frequency $f_1$ represents the information signal which experiences the same formation gain as does the auxiliary feedback signal passed from the electrode $A_1$. This information signal is supplied to the amplifier 50, experiences the gain of the variable gain section 28 and is withdrawn from the amplifier 50 at the point 53, being blocked by the rejection filter 51. Depending upon the bias set into the phase sensitive detector 58, the information signal at point 53 will have a fixed relationship to the information signal introduced at point 48. The ratio of the signal strength at point 53 to that at point 48 may be considered the effective loop gain for the information signal. Since the auxiliary feedback signal traverses the same path as does the information signal, the feedback signal will have a loop gain fixed relative to that of the information signal, neglecting attenuation in the rejection filter 51. Accordingly, by injecting the information signal derived from point 53 into the variable gain section 28 to adjust the gain of amplifier 50 in compensation for changes in formation gain, the loop gain for the feedback signal is correspondingly regulated. Moreover, the loop gain for the feedback signal may be set at a desired value by altering the bias of the phase sensitive detector 58.

Rather than employing an information signal with a distinguishable frequency, such signal may be of a phase distinguishable from the phase of the principal and auxiliary currents. Or, the information signal may be separated from the principal and auxiliary signals by time sharing, if desired. With the gain of the feedback loop automatically regulated, in any event, a resistivity reading is obtained by introducing a survey current of frequency $f_0$ from the oscillator 15 into the formations 13 at electrode $A_0$. Resistivity indications are then obtained at device 41 representing potential variations in the vicinity of electrode $A_0$, namely at electrode $M_1$.

In the embodiment of the invention depicted in FIG. 4, the feedback loop gain of the amplifier system is subject to a variation dependent upon the strength of the input signal. Again using the cushion member 62 as an electrode carrier in accordance with the teachings of aforementioned Patent No. 2,712,629, this input signal may be the component of potential difference across electrodes $M_1$, $M_1'$ attributable to the flow of survey current from the electrode $A_0$. Since the survey current encounters different resistivity conditions as the cushion member 62 traverses the length of the borehole, this component of potential difference will vary even though the survey current remains steady. As will be explained more fully hereafter, an amplifier 65 having an automatic volume control (AVC) section 66 with a relatively long time constant is supplied via conductors 21, 22 with this input component of potential difference across electrodes $M_1$, $M_1'$ to compensate for changes in input signal strength.

Providing a feedback signal via conductors 24, 25 to electrodes $A_1$, B is an amplifier 70 driven by a constant signal at frequency $f_0$ supplied by oscillator 15. The amplifier 70 has a gate section 71 as well as the variable gain section 28 whereby the output of amplifier 70 depends in magnitude upon the signal supplied the variable gain section 28 and may be cut off by energization of the gate section 71. Where the variable gain section 28 employs a pentode with suppressor grid control, the percentage change in gain of the variable gain section is a direct function of the amplitude of the control signal. Specifically, with the amplifier 70 in the feedback loop, a small change in the gain control signal causes an increasingly larger percentage change in gain of the amplifier as the control signal increases in amplitude, yielding a logarithmic gain control.

The control signal is derived from the AVC amplifier 65 through a gated amplifier 72 followed by a phase sensitive detector 73. The gain control signal is a rectified version of the output of amplifier 65 since the phase sensitive detector is supplied with a reference signal via conductor 14 from the oscillator 15. Both the gated amplifier 32 and the gate section 71 are coupled via conductor 75 to a blanking signal generator 76. This blanking signal generator may be of any conventional type supplying alternate positive and negative pulses, generally of square wave form. Conveniently, it may be energized from an A.C. source 16 at the surface of the earth via conductor 76a. Conductor 75 from the blanking signal generator 76 also connects with a gated amplifier 77 interposed in conductor 21 between the phase sensitive detector 43 and the measure electrode $M_1$.

The feedback loop thus includes the AVC amplifier 65, the gated amplifier 72, the phase sensitive detector 73, the gated variable gain amplifier 70, electrodes $A_1$, B and electrodes $M_1$, $M_1'$, as well as the path followed by the feedback signal through the formations 13. Because of the gain control characteristics of the amplifier 70, changes in formation gain for the feedback signal tend automatically to be compensated by inverse changes in gain in the variable gain section 28. Thus, if the formation gain drops while the input signal remains constant, the error signal will increase, increasing the gain of the amplifier 70 just sufficiently to bring the error signal or potential difference across electrodes $M_1$, $M_1'$ substantially to zero. However, if the input signal increases, as by an increase in resistivity of the media traversed by the steady survey current from $A_0$, assuming a constant formation gain in the feedback loop, the error signal again increases to effect an increase in the percentage change in gain of the amplifier 70. Even though the output of the amplifier introduced through electrode $A_1$ returns the error signal substantially to zero, this output is at a higher level representing a higher gain in the amplifier 70 and consequently a higher feedback loop gain. But for the operation of the amplifier 65, the feedback loop gain would thus become directly dependent upon the strength of the input signal at electrodes $M_1$, $M_1'$ which, in turn is dependent upon the resistivity characteristics of the media through which the constant survey current flows. For convenience, these characteristics may also be referred to as formation gain in similarity to the gain experienced by the feedback signal passing from the electrode $A_1$ to the electrodes $M_1$, $M_1'$.

To regulate the tendency of a varying input signal to alter the feedback loop gain, the amplifiers 70 and 72 are periodically gated off by the blanking signal generator 76 so that the AVC amplifier 65 receives only the input potential difference signal induced at electrodes $M_1$, $M_1'$ by the survey current from electrode $A_0$. If the formation gain for this input signal is high so that the signal supplied to amplifier 65 is high, the AVC section 66 automatically diminishes the gain of amplifier 65 in inverse proportion to such formation gain. Similarly, if the formation gain for the input signal decreases, the gain of the AVC section 66 increases. Since the AVC amplifier 65 forms a part of the feedback loop, the adjustment of its gain in inverse proportion to the formation gain experienced by the input signal regulates the feedback loop gain against variation with changes in the input signal. It will be understood that the time constant of the AVC section 66 is sufficiently long that its adjustment by the strong, unopposed input signal during gated-off portions of the cycle effectively continues through the succeeding gated-on period.

While the potential of the monitoring electrode $M_1$ during "off" periods may be suitably recorded to provide information of interest in well logging, interposition of the gated amplifier 77 between the monitoring electrode $M_1$ and the device 41 allows resistivity indications to be recorded similar to those obtained with the apparatus of FIG. 3.

It may be observed that the formation gain as measured between electrodes $A_1$ and $M_1$, $M_1'$ and the formation gain as measured between electrodes $A_0$ and $M_1$, $M_1'$ may differ substantially at any given level in the borehole. While the embodiments of FIGS. 1 and 3 have a feedback loop gain sensitive to changes in formation gain between electrodes $A_1$ and $M_1$, $M_1'$ and are arranged to automatically compensate for such changes, the embodiment of FIG. 4 is particularly sensitive to changes in formation gain as measured between electrodes $A_0$ and $M_1$, $M_1'$.

These several embodiments serve to illustrate the scope of the invention but should not be taken as defining its limits. Thus, each of the embodiments may be utilized with any of the well logging systems in the above-identified patents, as well as a variety of other well logging systems, including those disclosed in Patents Nos. 2,712,630 and 2,712,631, issued July 5, 1955. Moreover, the principles of the invention are not restricted solely to well logging applications but may be employed wherever regulation of feedback loop gain variations is desired. The invention is applicable not only to loop gain regulation where the source of loop gain variation lies within the feedback loop, but also to a regulation of loop gain variations which are dependent upon the gain in the input circuit to the feedback amplifying system. In either event, an information signal is passed through the element giving rise to loop gain variations and is then employed degeneratively to regulate these variations. This information signal is so characterized that in one of a variety of ways it may be distinguished from the input, error and feedback signals also present in the amplifier system.

The invention is not restricted to purely electronic amplifying systems but may include, for example, electromechanical amplifying elements such as those employed in servo amplifying systems. Thus, the principles of the invention are applicable to a well logging system utilizing servo control of auxiliary feedback signals, such as that shown in copending application Serial No. 248,384 filed September 26, 1951, by G. K. Gillies and assigned to the assignee hereof, now Patent 2,752,561, granted June 26, 1956.

Accordingly, the invention is not limited to the illustrated embodiments but is of a scope defined in the appended claims.

I claim:

1. In a method for regulating the loop gain for a feedback signal traversing a feedback loop having a variable portion therein, the steps of passing an information signal through said variable portion distinguishable from said feedback signal to provide a measure of the gain of said variable portion, and adjusting the signal gain in another portion of the loop inversely with the measure of gain provided by said information signal.

2. In a method of stabilizing a feedback system for establishing a condition of constant potential difference in a medium, the steps of introducing an input signal to said medium, introducing an inverse feedback signal into said medium as an amplified version of an error signal representing the deviation from the desired constant potential difference condition, introducing an information signal into said medium to experience the gain thereof, and controlling the amplification gain of said error signal inversely with the gain experienced by said information signal.

3. In a method of regulating the loop gain of a feedback signal traversing a feedback loop which is oscillatory at a frequency different from the frequency of said feedback signal, the steps of detecting the oscillatory signal traversing the feedback loop, and controlling the amplification gain of the feedback and oscillatory signals inversely with the magnitude of said detected signal.

4. In a method of regulating the loop gain of a feedback signal traversing a feedback loop, the steps of passing an information signal distinguishable from said feedback signal around said feedback loop, detecting the information signal, and regulating the loop gain inversely with the magnitude of said detected signal.

5. In a method of regulating the loop gain of a feedback signal traversing a feedback loop, the steps of injecting an information signal distinguishable from said feedback signal into said loop, withdrawing from said feedback loop a version of said information signal which has experienced substantially the entire gain of said loop, and controlling the amplification gain of said feedback signal inversely with the gain experienced by said information signal.

6. In a feedback system including a variable gain coupling, the combination comprising variable gain amplifying means to pass a feedback signal through said coupling, means for passing an information signal through said coupling distinguishable from said feedback signal to experience a variable gain therein, and means responsive to said information signal for adjusting the gain of said variable gain amplifying means in accordance with the gain experienced by said information signal.

7. In a feedback system including a variable gain coupling, the combination comprising variable gain amplifying means to pass a feedback signal through said coupling, means for passing an input signal through said coupling to produce with said feedback signal an error signal for driving said amplifying means, means for passing an information signal through said coupling distinguishable from said error signal to experience a variable gain therein, and means responsive to said information signal for adjusting the gain of said variable gain amplifying means inversely with variations in gain experienced by said information signal.

8. In a feedback system including a variable gain coupling, the combination comprising variable gain amplifier means to pass a feedback signal through said coupling, means for passing an information signal through said variable gain coupling coincident with said feedback signal, and means selectively responsive to said information signal for adjusting the gain of said variable gain amplifier means inversely with variations in gain experienced by said information signal.

9. In a feedback amplifier system including a variable gain coupling, the combination comprising variable gain amplifier means to pass a feedback signal through said coupling, said amplifier means being oscillatory at a frequency different from the frequency of said feedback signal to pass an oscillatory information signal through said coupling, and gain control means selectively responsive to said information signal for adjusting the gain of said variable gain amplifier means inversely with variations in gain experienced by said information signal.

10. In a feedback amplifier system, the combination comprising an amplifier having a variable gain section, and means including a variable gain coupling to provide a feedback loop for carrying a feedback signal from said amplifier to diminish the input to said amplifier, said amplifier including frequency sensitive elements which for a given frequency different from the frequency of said feedback signal permit an information signal to circulate said feedback loop by regenerative oscillations therein, said variable gain section being selectively responsive to said information signal to maintain a loop gain of substantially unity for said information signal.

11. In a feedback system including a variable gain coupling, the combination comprising variable gain amplifying means to pass a feedback signal through said coupling, separate electric source means for passing an information signal through said variable gain coupling, and means selectively responsive to said information signal for adjusting the gain of said variable gain amplifying means inversely with variations in gain experienced by said information signal.

12. In a feedback system including a variable gain coupling, the combination comprising variable gain amplifier means to pass a feedback signal through said coupling, separate oscillator means for passing an information signal through said variable gain coupling coincident with said feedback signal, and detector means coupled to said amplifier means and to said oscillator means for adjusting the gain of said amplifier means inversely with the strength of said information signal as derived from said coupling.

13. In a feedback system including a variable gain coupling, the combination comprising variable gain amplifying means to pass a feedback signal through said coupling, said amplifying means having a variable gain section with a gain adjustable by means of a control signal and having an input for receiving a steady energizing signal, means for passing an information signal and an input signal through said coupling to experience a variable gain therein and to develop an error signal, means including an automatic volume control amplifier for translating said error signal into a control signal for adjusting the gain of said variable gain amplifying means, said automatic volume control amplifier being responsive to said information signal to adjust its gain inversely with respect to the gain in said coupling experienced by said information signal.

14. In apparatus for investigating earth formations traversed by a borehole, the combination comprising means for introducing an input signal at a first point in a borehole, variable gain amplifying means responsive to a potential difference in the vicinity of said first point to control the introduction of a feedback signal at a second point in the borehole tending to diminish said potential difference, means for introducing an information signal distinguishable from said feedback signal into said borehole at one of said points, and gain control means responsive to said information signal to vary the gain of said amplifying means in regulation of the loop gain for said feedback signal.

15. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, electrical means responsive to the potential difference between a pair of points differently spaced intermediate said electrodes for passing a feedback current from said auxiliary electrode into the borehole tending to diminish said potential difference, said electrical means including variable gain amplifying means for amplifying said potential difference, one of said electrodes being arranged for passing an information signal into the borehole, and gain control means selectively responsive to said information signal for varying the gain of said amplifying means to regulate the loop gain for said feedback signal.

16. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, and one of said electrodes being arranged for passing an information signal into the borehole, electrical means responsive to the potential difference between a pair of points differently spaced from said electrodes for passing a feedback current from said auxiliary electrode into the borehole tending to diminish the potential difference, said electrical means including variable gain amplifying means for amplifying said potential difference, means for rendering said information signal distinguishable from said potential difference, and gain control means selectively responsive to said information signal as derived from said pair of points for varying the gain of said amplifying means to regulate the loop gain for said feedback signal.

17. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, electrical means responsive to the potential difference between a pair of points differently spaced intermediate said electrodes for passing a feedback current from said auxiliary electrode into the borehole tending to diminish said potential difference, said electrical means including variable gain amplifying means for amplifying said potential difference and for oscillating to circulate an information signal with said feedback signal, and gain control means selectively responsive to said information signal for varying the gain of said amplifying means to regulate the loop gain for said feedback signal.

18. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, an electrical feedback circuit including a variable gain amplifier responsive to the potential difference between a pair of points differently spaced intermediate said electrodes for passing a feedback current from said auxiliary electrode into the borehole tending to diminish said potential difference, said feedback circuit being oscillatory at a frequency different from the frequency of said currents to circulate a distinguishable information signal via said auxiliary electrode, and means for detecting said information signal as derived from said variable gain amplifier to vary the gain of said amplifier whereby to regulate the loop gain of said feedback signal.

19. In apparatus for investigating earth formations traversed by a borehole, the combination comprising a main electrode adapted to be lowered into a borehole, electric source means connected to said main electrode and to a point remote from said main electrode for passing survey current at a first frequency from said main electrode into the surrounding formations, an auxiliary electrode in the vicinity of said main electrode, monitoring electrodes intermediate said main and auxiliary electrodes, variable gain amplifying means having its input connected to said monitoring electrodes and its output connected to said auxiliary electrode and to a remote reference point for passing degenerative feedback current from said auxiliary electrode, said amplifying means having gain and phase shift characteristics rendering it oscillatory at a frequency different from said first frequency to pass an information signal at the oscillatory frequency with said feedback signal, and gain control means selectively responsive to said information signal for varying the gain of said amplifying means to maintain the loop gain for said information signal substantially at unity.

20. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, electrical means responsive to the potential difference between a pair of points differently spaced intermediate said electrodes for passing a feedback current from said auxiliary electrode into the borehole tending to diminish said potential difference, said electrical means including variable gain amplifying means for amplifying said potential difference, separate electric source means connected to one of said electrodes and to a remote reference point for introducing an information signal into the borehole, and gain control means selectively responsive to said information signal as derived from said pair of points for varying the gain of said amplifying means to regulate the loop gain for said feedback signal.

21. In apparatus for investigating earth formations traversed by a borehole, the combination as defined in claim 20, wherein said separate electric source means is connected to said auxiliary electrode, and said gain control means includes a biased phase sensitive detector coupled to said amplifying means to vary the gain thereof inversely with said information signal to regulate the loop gain for said feedback signal.

22. In apparatus for investigating earth formations traversed by a borehole, the combination as defined in claim 21, further comprising filter means connected between the input of said phase sensitive detector and the output of said separate electric source means for rejecting said information signal while passing said feedback signal.

23. In apparatus for investigating earth formations traversed by a borehole, the combination comprising a main electrode adapted to be lowered into a borehole, electric source means connected to said main electrode and to a point remote from said main electrode for passing a survey current and an information signal from said main electrode into the surrounding formations, an auxilary electrode in the vicinity of said main electrode, electrical means responsive to the potential difference between a pair of points differently spaced intermediate said electrodes for passing a feedback current from said auxiliary electrode into the borehole tending to diminish said potential difference, said electrical means including variable gain amplifying means for amplifying said potential difference, and gain control means selectively responsive to said information signal for varying the gain of said amplifying means to regulate the loop gain for said feedback signal.

24. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, electrical means responsive to a potential difference between a pair of points differently spaced intermediate said electrodes for passing a feedback current from said auxiliary electrode into the borehole tending to diminish said potential difference, said electrical means including variable gain amplifying means for amplifying said potential difference, gating means for periodically interrupting said feedback signal, and volume control means for regulating the output of said variable gain amplifying means during periods when said feedback signal is interrupted whereby to regulate the loop gain of said feedback signal during alternate periods.

25. In apparatus for investigating earth formations traversed by a borehole, the combination comprising a main electrode adapted to be lowered into a borehole, electric source means connected to said main electrode and to a point remote from said main electrode for passing survey current from said main electrode into the surrounding formations, an auxiliary electrode in the vicinity of said main electrode, a variable gain amplifier having its output connected to said auxiliary electrode and to a remote reference point, electric source means for energizing said variable gain amplifier to pass an inverse feedback signal from said auxiliary electrode into the borehole, electrical means including an amplifier with an automatic volume control section responsive to the potential difference between a pair of points differently spaced intermediate said electrodes for controlling the gain of said variable gain amplifier, gating means for periodically interrupting said feedback signal, said automatic volume control section having a long time constant whereby its adjustment during periods of feedback signal interruption is continued during the succeeding period to regulate the loop gain for said feedback signal.

References Cited in the file of this patent

UNITED STATES PATENTS

| | | |
|---|---|---|
| 2,231,527 | Chesnut | Feb. 11, 1941 |
| 2,245,428 | Campbell | June 10, 1941 |
| 2,283,241 | Cott | May 19, 1942 |
| 2,343,207 | Schrader | Feb. 29, 1944 |
| 2,623,955 | Zelst | Dec. 30, 1952 |
| 2,694,114 | Kalfaian | Nov. 9, 1954 |
| 2,713,664 | Magnuski | July 19, 1955 |
| 2,729,784 | Fearon | Jan. 3, 1956 |
| 2,752,571 | Terroni | June 26, 1956 |
| 2,817,715 | Blake | Dec. 24, 1957 |